United States Patent
Hessler et al.

(10) Patent No.: US 11,064,438 B2
(45) Date of Patent: Jul. 13, 2021

(54) RELIABLE COMMUNICATION TO ENERGY-DETECTION RECEIVERS

(71) Applicant: Telefonaktiebolaget LM Ericsson (publ), Stockholm (SE)

(72) Inventors: Martin Hessler, Linköping (SE); Emil Björnson, Linköping (SE); Marcus Karlsson, Linköping (SE); Eric G. Larsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 212 days.

(21) Appl. No.: 16/082,326

(22) PCT Filed: Mar. 7, 2016

(86) PCT No.: PCT/EP2016/054746
§ 371 (c)(1),
(2) Date: Sep. 5, 2018

(87) PCT Pub. No.: WO2017/152929
PCT Pub. Date: Sep. 14, 2017

(65) Prior Publication Data
US 2019/0281552 A1 Sep. 12, 2019

(51) Int. Cl.
*H04W 52/02* (2009.01)
*H04W 24/10* (2009.01)
(Continued)

(52) U.S. Cl.
CPC ...... *H04W 52/0245* (2013.01); *H04B 17/318* (2015.01); *H04J 13/0062* (2013.01);
(Continued)

(58) Field of Classification Search
CPC .. H04B 7/0669; H04B 7/0626; H04B 7/0456; H04B 7/0639; H04B 7/04
See application file for complete search history.

(56) References Cited

U.S. PATENT DOCUMENTS

| 7,411,492 B2 | 8/2008 | Greenberg |
| 2005/0078761 A1* | 4/2005 | Hottinen ............. H04B 7/0465 375/267 |

(Continued)

FOREIGN PATENT DOCUMENTS

| CA | 2931361 A1 | 6/2015 |
| CN | 1586046 A | 2/2005 |

(Continued)

OTHER PUBLICATIONS

First Examination Report for Indian Application No. 201817033789 dated Oct. 21, 2020, 6 pages.

(Continued)

*Primary Examiner* — Romani Ohri
(74) *Attorney, Agent, or Firm* — Sage Patent Group (57) ABSTRACT

A method for detecting a data transmission, the method including measuring a signal level for each of a predetermined plurality of distinct time-frequency transmission resources within a first time interval, non-coherently summing the measured signal levels, and comparing the sum to at least a first threshold to determine whether a channel-hardened signal targeted to the wireless receiver is present. A corresponding method for encoding a channel-hardened signal comprises transmitting, in a first time interval and using M antenna ports and T1 time-frequency resources, an array X of M×T1 symbols, where each row of the array corresponds to one of the M antenna ports and each column of the array X corresponds to one of the first set of T1 time-frequency resources. X satisfies the expression $XX^H = \alpha I$, where $X^H$ is the conjugate transpose of X, I is an identity matrix, and $\alpha$ is a constant.

9 Claims, 6 Drawing Sheets

(51) Int. Cl.
H04B 17/318 (2015.01)
H04J 13/00 (2011.01)
H04L 5/00 (2006.01)

(52) U.S. Cl.
CPC .......... *H04L 5/0007* (2013.01); *H04W 24/10* (2013.01); *H04W 52/0235* (2013.01); *Y02D 30/70* (2020.08)

(56) References Cited

U.S. PATENT DOCUMENTS

| | | |
|---|---|---|
| 2006/0041656 A1 | 2/2006 | Li et al. |
| 2009/0082017 A1 | 3/2009 | Chang et al. |
| 2013/0308542 A1 | 11/2013 | Kang et al. |
| 2015/0124897 A1 | 5/2015 | Phan Huy |
| 2017/0339711 A1* | 11/2017 | Belghoul .......... H04W 28/0273 |
| 2018/0115444 A1* | 4/2018 | Lee ................ H04L 27/2634 |
| 2019/0044590 A1* | 2/2019 | Hessler ............. H04B 17/104 |
| 2020/0143721 A1* | 5/2020 | Chu ..................... H04L 1/24 |
| 2020/0274613 A1* | 8/2020 | Gao .................. H04B 7/0426 |

FOREIGN PATENT DOCUMENTS

| | | |
|---|---|---|
| CN | 101378300 A | 3/2009 |
| CN | 102273087 A | 12/2011 |
| CN | 102342075 A | 2/2012 |
| CN | 103763016 A | 4/2014 |
| CN | 104601297 A | 5/2015 |
| CN | 105281815 A | 1/2016 |

OTHER PUBLICATIONS

First Chinese Office Action for Chinese Patent Application No. 201680085487.5 dated Mar. 12, 2021, 9 pages.

* cited by examiner

RELIABLE COMMUNICATION TO ENERGY-DETECTION RECEIVERS

TECHNICAL FIELD

The present disclosure is generally related to wireless communications, and is more particularly related to techniques for transmitting and receiving signals designed for high-reliability, low-power, detection.

BACKGROUND

With the development of the so-called Internet of Things, it is anticipated that millions upon millions of small, low-power devices will be deployed as sensors, control devices, and the like. Many of these devices will be battery powered. Accordingly, it is critical that these devices consume as little energy as possible, particularly when not actively engaged in communications with the surrounding wireless network.

At the same time, these devices should preferably be compatible, at least in some respects, with existing 4G wireless networks and/or the developing 5G wireless networks. These networks, however, generally have radio access technologies that are quite complex, requiring the use of sophisticated hardware and computationally complex signal processing. Still further, many devices are likely to be deployed in locations outside of high-traffic areas for people, which means that it may be challenging in many cases to reach these devices with reliably detectable and decodable radio signals, without causing undue interference to other wireless devices. All of these problems make the development of ultra-low-power receiver circuits for the Internet of Things very challenging.

SUMMARY

Some embodiments of the presently disclosed techniques facilitate the design and deployment of low-power receiver devices by utilizing a large array of antennas at the transmitter. By transmitting amplitude-modulated (e.g., on-off-keyed) space-time coded signals to the receiver devices, a channel-hardening phenomenon can be harnessed, so that the received signal at an energy detector in a receiver device is less affected by channel fluctuations as more antennas are used at the transmitter. Control information can then be transferred by modulating the power of the transmitted signal, processing the signal at the device by adding the received energy over an interval, and then making a hypothesis test to determine the transmitted signal power.

An example embodiment is a method, in a wireless receiver, for detecting a data transmission, where the method includes measuring a signal level for each of a predetermined plurality of distinct time-frequency transmission resources within a first time interval, and non-coherently summing the measured signal levels to obtain a sum. The method further includes comparing the sum to at least a first threshold to determine whether a channel-hardened signal targeted to the wireless receiver is present in the first time interval.

Another embodiment of the presently disclosed techniques is a corresponding method, in a wireless transmitter, for encoding a signal. This method comprises transmitting, in a first time interval and using M antenna ports and a first set of T1 time-frequency resources, an array X of M×T1 symbols, where each row of the array corresponds to one of the M antenna ports and each column of the array X corresponds to one of the first set of T1 time-frequency resources. X satisfies the expression $XX^H=\alpha I$, where $X^H$ is the conjugate transpose of X, I is an identity matrix, and $\alpha$ is a constant, and the rows of the array X consist of orthogonal, length-T1, Zadoff-Chu sequences.

Another embodiment is a wireless receiver that comprises an energy-detector circuit configured to measure a signal level for each of a predetermined plurality of distinct time-frequency transmission resources within a first time interval and a summing circuit configured to non-coherently sum the measured signal levels to obtain a sum. The wireless receiver further comprises a comparator circuit configured to compare the sum to at least a first threshold to determine whether a channel-hardened signal targeted to the wireless receiver is present in the first time interval.

Still another embodiment is a wireless transmitter that comprises an array of at least M antenna elements and a transmitter circuit coupled to the array via M antenna ports and configured to transmit, in a first time interval and using the M antenna ports and a first set of T1 time-frequency resources, an array X of M×T1 symbols. Each row of the array corresponds to one of the M antenna ports and each column of the array X corresponds to one of the first set of T1 time-frequency resources. X satisfies the expression $XX^H=\alpha I$, where $X^H$ is the conjugate transpose of X, I is an identity matrix, and $\alpha$ is a constant, where the rows of the array X consist of orthogonal, length-T1, Zadoff-Chu sequences.

These and other aspects and embodiments of the presently disclosed techniques and apparatus are illustrated in the attached figures and described in detail below.

DETAILED DESCRIPTION

As discussed above, wireless trends demand the availability of ultra-low-power, high-reliability receiver devices. One way to reduce power in these devices is to deactivate most of the circuitry when there is no active communication going on, leaving only a very low-power receiver circuit active to monitor for a "wake-up" signal transmitted by the wireless network. However, if this wake-up signal is transmitted using conventional techniques and signal formats like those used in 4G wireless networks, like the Orthogonal Frequency-Division Multiplexing (OFDM) signal formats and protocols used by the Long-Term Evolution (LTE) networks developed and deployed by the members of the 3rd-Generation Partnership Project, complex receivers and signal processing processes are required, making it difficult to achieve ultra-low power consumption. To send control signals to wake up a battery-powered device, such as a low-power sensor, it is therefore preferable to have an energy-efficient, low-complexity, communication scheme that only requires low-power receiver hardware. At the same time the communication must be highly reliable so that the control signals are correctly received and decoded at the target device.

One very simple and energy-efficient receiver is an energy detector, which only measures the total received signal energy in a particular time-frequency resource, i.e., in a given frequency range, over a given time interval. (The measurement may reflect the amplitude, power, or energy of the received signal; for the present purposes, these are equivalent.) At its most basic, the device can utilize such a power measurement to decide whether a signal is present or if only noise is present. With multiple thresholds, the device may be able to distinguish between two or more different signal power levels, in addition to noise.

In a device configured for basic signal detection, if the measured energy exceeds a predefined threshold, the sensor concludes that a signal is present. Mathematically, this can be stated as a hypothesis test:

Null hypothesis (H0): r=n
Alternative hypothesis (H1): r=s+n

Here, r is the received signal, with signal parts and noise part n. The received signal energy $|r|^2$ is compared to a threshold, which leads to a decision that can be easily implemented. A value corresponding to $|r|^2$ can be measured using only an energy detector.

In practice, the signal parts will be a product of the channel fading coefficient h and a transmitted symbol x, i.e., s=h·x. Since physical variations in the channel propagation environment (e.g., small-scale fading) can make the amplitude of the fading coefficient, $|h|$, vary by tens of dB, the received signal energy can fluctuate substantially and x cannot be detected with high reliability.

In order to discriminate between signals aimed for certain devices in the network, the devices might want to look at a sequence of hypothesis tests, make a sequence of hypothesis decisions (e.g., H0, H1, H1, H0 . . . H1), and map these to a binary sequence (e.g., 0110 . . . 1) that identifies the desired device if the sequence is correctly decoded. However, this procedure is very difficult to make robust when the fading h varies between different hypothesis tests, because $|h|$ is likely to be small during some of the tests.

According to some embodiments of the presently disclosed techniques, these problems are addressed by utilizing an array of antennas at the transmitter. By sending amplitude-modulated space-time coded signals to the user devices, a "channel-hardening" phenomenon can be harnessed so that the received signal from an energy detector is less affected by channel fluctuations as more antennas are used at the transmitter. Control information can then be transferred by modulating the power of the transmitted signal, processing the signal at the device by adding the received energy over an interval, and then making a hypothesis test to determine the transmitted signal power.

In more detail, if a transmitter is equipped with many antennas, the small-scale fading fluctuations can be mitigated due to a phenomenon called channel hardening. As noted above, the amplitude of a single fading coefficient, $|h|$, may vary by many dB, which makes reliable detection problematic. Channel hardening is the effect that a received signal fluctuates less when the signal has propagated over multiple paths having relatively uncorrelated channel realizations. Let $h^H = [h_1 h_2 \ldots h_M]$ denote the M-dimensional channel between a transmitter with M antennas and a single-antenna sensor. When a signal s is spread equally over the antennas, the effective squared channel amplitude is $$\frac{\|h\|^2}{M} = \frac{h^H h}{M}.$$

An important property of this result is that its variance decreases as M increases. For example, the variance goes to zero as 1/M, for independent Rayleigh fading channel coefficients. This is the essence of channel hardening.

Channel hardening has been utilized previously for coherent beamforming transmission from large antenna arrays, to provide targeted transmissions to particular devices. However, these prior techniques require that that the transmitting node have recent estimates of the channels from the transmitting elements to the receiving device. Thus, coherent beamforming techniques cannot be used when waking up a dormant receiving device, as channel estimates will be unavailable to the transmitting device. Accordingly, a key aspect of several embodiments of the presently disclosed techniques is to provide a transmitted signal with certain properties that make it possible for an energy-detecting device to exploit channel hardening for reliable hypothesis testing.

The present document will use the term "channel hardening" to refer to techniques whereby a composite channel for a transmitted signal is formed, using multiple transmitting antenna elements, in such a way that the resulting composite channel for the signal exhibits an invariance of statistics. The term "channel-hardened signal" refers to a signal formed and transmitted in this manner.

Note that this invariance of statistics may be a substantial invariance of statistics, i.e., as compared to the channel statistics that would be observed over a transmission path between only one of the transmitting antenna elements and the receiving device. That is to say, although the statistics may be variable within a certain predetermined range, the radio channel can still be considered to be hardened, in that its variations are substantially less than would be expected for a single-antenna-to-single-antenna transmission between the transmitting and receiving devices. A threshold (corresponding to an acceptable deviation) may be set according to which the channel is considered being hardened. Also note that this invariance of statistics may relate to first and/or second order statistics of the radio channel, respectively. As understood by those skilled in the art of statistics, first order statistics correspond to the arithmetic mean, and second order statistics correspond to the variance with respect to the arithmetic mean.

Let X be a predefined M by T matrix of symbols transmitted from an M-antenna base station to a low-power receiving device. T is the number of channel uses, i.e., distinct time-frequency resources used for the transmission of X. In an LTE environment, for example, these distinct time-frequency resources could be individual resource elements (or groups of resource elements) in the LTE downlink subframe structure. The transmitted power is denoted by p. Furthermore, let X be such that $$XX^H = \frac{pT}{M}I,$$

where I is an M by M identity matrix. Note that this property holds, for example, for all orthogonal space-time block codes, including the Alamouti code.

Assuming a single receiver chain at the receiving device, the received signal is then a 1 by T vector that can be written as $r^H = h^H X + n^H$. Looking at the energy of the desired signal, $h^H X$, we get $$\|h^H X\|^2 = h^H X X^H h = \frac{pT}{M} \|h\|^2.$$

If M=1, then this is equal to $pT|h|^2$, which fluctuates greatly due to channel fading. But as the number of antennas, M, increases, the fluctuations in $\|h\|^2$ diminish and the transmit power p can be detected reliably, using a hypothesis test. Note that the primary advantage of having more antennas is not that the desired signal has higher expected signal energy, but that the received signal energy converges towards its mean and thus becomes robust to channel fading. This means that for a given transmission power and a certain threshold, we will get fewer false detections and fewer missed detections, as compared with fewer transmit antennas Note that an energy detector can measure $\|r\|^2 \approx \|h^H X\|^2 + \|n\|^2$ by simply measuring the received signal energy per channel use and then summing these measurements over the transmission duration of X. Hence, the device can make use of channel hardening to achieve a received signal energy with small channel amplitude fluctuations. The transmitter can transfer information reliably by modulating the transmit power p, for example using amplitude-shift keying (e.g., on-off keying). The receiver makes hypothesis tests as described earlier to detect this power levels. On-off keying does not require detailed knowledge of what $\|h\|^2$ converges to, while general amplitude-shift keying requires some signal-to-noise ratio (SNR) information.

Consider an example to illustrate the benefits of the presently disclosed techniques. Assume that an antenna array of M=256 antenna elements is available to the transmitter. Further assume that the channels between each of these antenna elements and the receiving device antenna are independent, equally-distributed Rayleigh fading channel realizations. To simplify the expressions somewhat, further assume unit-energy-modulation, so that the symbol energy can be assumed to be 1, and that the signaling is implemented within one coherence block (coherence bandwidth times coherence time. The time-frequency resources used for transmitting the space-time-block-coded transmission as described above are used either for regular data transmissions or are blanked when the detector is listening to the transmission as described above. This implies that the receiver has different detection problems depending on the two possible implementations. In the first scenario, regular data can be transmitted in the resources used for the channel-hardened signal (in a worst case scenario with 100% load) with a signal energy of the same expected amplitude, when no channel-hardened signal is present (i.e., when the channel-hardened signal is "zero"). If the resources are blanked when no channel-hardened signal is transmitted, then there is only noise, and hence the expected amplitude at the receiver is lower if there is no signal. If low overhead is more important than reliability the first embodiment can be used, for example, for a "wake-up" signal to smart phones.

Figure 1:
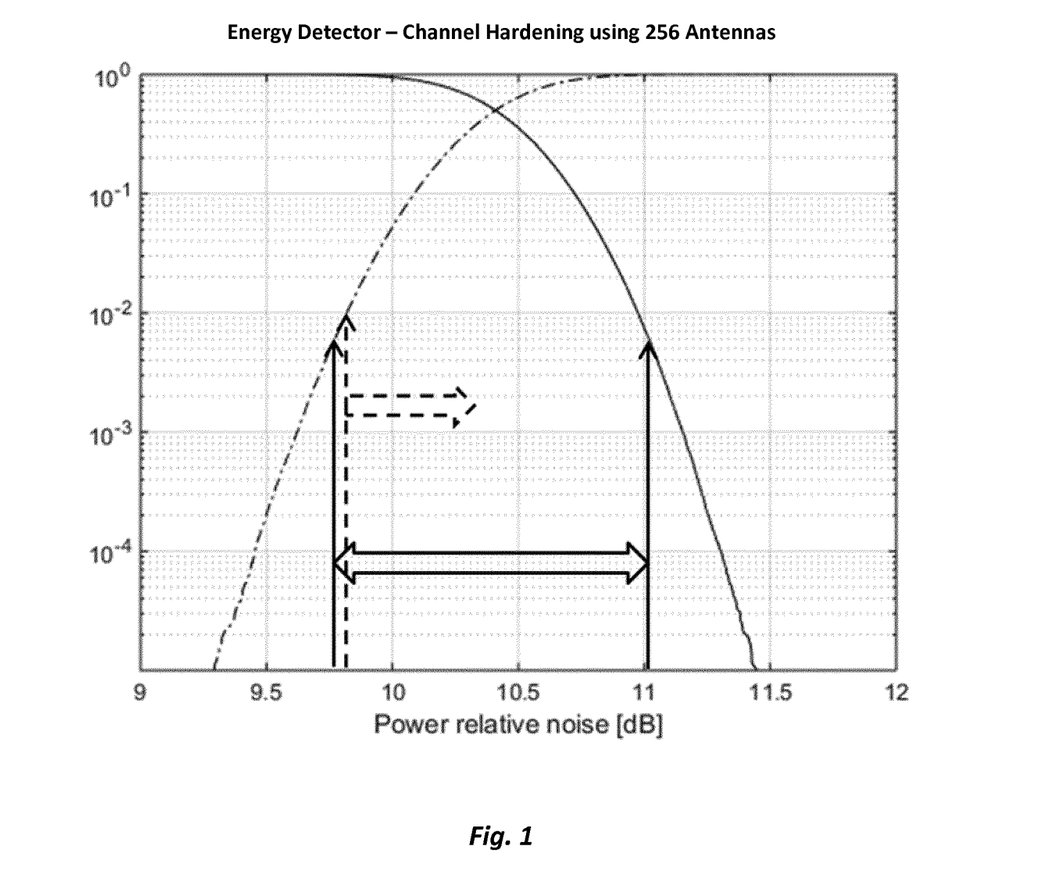
FIG. 1 illustrates detection intervals for an example implementation of the presently-disclosed channel-hardening transmission techniques.
Figure 2:
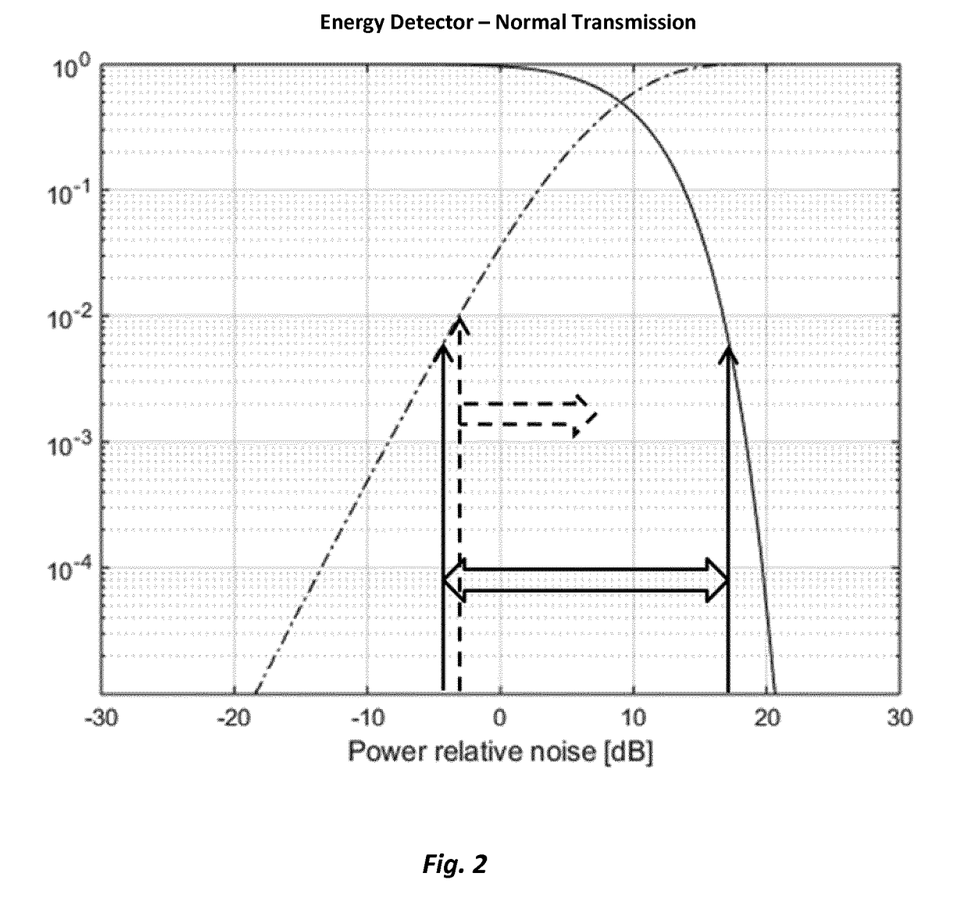
FIG. 2 shows detection intervals for a normal data transmission, for comparison to FIG. 1.
Figure 3:
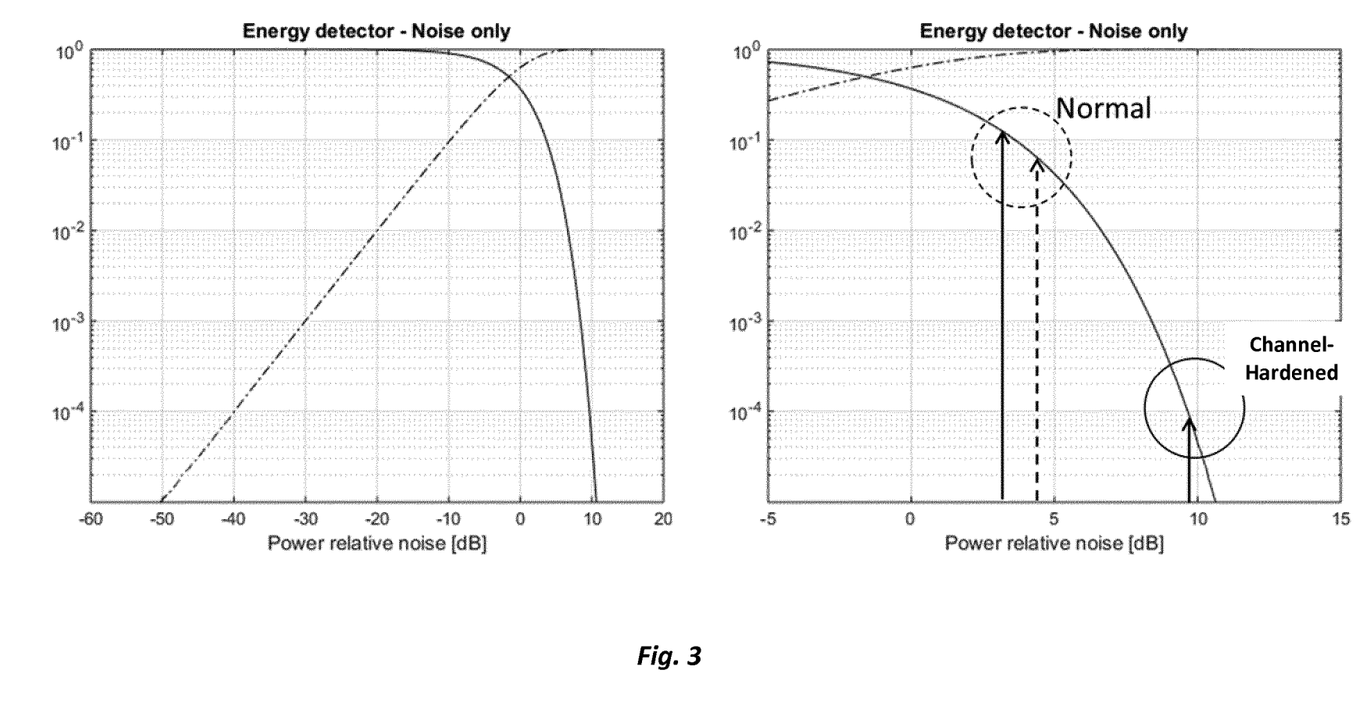
FIG. 3 illustrates the false detection probabilities for the example channel-hardened transmissions and for normal data transmissions.

Finally, for this example it is assumed further that the number of used resource elements T≥M is configured in such a way that the receiving device sees a sufficient amount of energy to achieve a target SNR (or signal-to-interference-plus-noise ratio, SINR) in the ranges illustrated in FIGS. 1-3. From a practical implementation point of view, it may be desirable to modulate each resource element in the coherence block with constant modulus for each antenna element. This may be done, for example, by mapping a set of M orthogonal Zadoff-Chu sequences of length T to the rows of the matrix X. Then, the detector simply needs to accumulate energy over the T resource elements. In implementations that utilize the LTE downlink subframe structure, T could be picked so that an integer number N of LTE resource blocks are used, e.g., N=2, 3, . . . , where each resource block in LTE consists of 168 resource elements (14 OFDM symbols by 12 subcarriers, assuming normal cyclic prefixes). This would result in T=N*168, where N may depend on the path-loss to the receiving device. The transmissions might be scheduled in multicast-broadcast single-frequency network (MBSFN) subframes, for example.

FIG. 1 illustrates example detection intervals for both a single-sided and double-sided detector, for a transmission according to the example above, i.e., with 256 antenna elements, T≥M, at in the range of SNR (or SINR) levels as shown on the x-axis of the diagram. In the illustrated plot, then, the x-axis shows an energy level x, relative to the noise, in dB, and the y-axis shows probability. The solid lines show Pr(X>x), where X is the detected energy. The dash-dotted lines show Pr(X≤x). If the probability of missed detection is set to $10^{-2}$, then FIG. 1 shows that the thresholds of the detector, when determining whether or not a channel-hardened signal is transmitted according to the techniques described, should be 9.7-11 dB for a two-sided test, or 9.8 dB for a one-sided test.

For comparison, FIG. 2 shows similar curves for a "normal" data transmission, i.e., when the T time-frequency resources are used for the transmission of user data, rather than for a transmission of channel-hardened signal as described above. For the same probability of missed detection, the corresponding thresholds are −4.7-17.3 dB and −3.1 dB for the two-sided and one-sided tests, respectively.

In FIG. 3, the same curves are shown when only noise is present. The curves in FIG. 3 can be used to find the probabilities of false detection for the two transmission strategies. For the channel-hardened transmission example, the detection threshold of 9.8 dB corresponds to a probability of false detection of approximately $10^{-4}$ (for both the one-sided and two-sided detection techniques). Compare this to a corresponding probability of false detection of 0.13 (0.05 for one-sided) for the normal transmission case. In other words, in this example use of the time-frequency resources, false detection is three orders of magnitude more frequent in normal transmission compared to when using the channel-hardened transmission.

Note that with the channel-hardening transmission techniques described above, it would be possible to multiplex detection transmissions with normal data transmissions, e.g., such that the detector listens to symbols that are reused for data transmissions unless the detector is signaled. The detector blindly detects the channel-hardened transmission from the measured energy. Observe that here the false detection rate is much higher at 11%, but for many applications for more advanced devices an 11% false detection rate is manageable if detection is used for a correct purpose, for example, if the energy detector is used to wake a device for reception of some other data transmission using a more advanced receiver. In this case 11% is an energy savings, in that in eight out of nine reception times the UE can stay asleep and not wake the full receiver chain.

In view of the above description and detailed examples, it will be appreciated that embodiments of the presently disclosed techniques exploit large antenna arrays at a transmitter to enable very cheap and energy efficient detectors. This is done by assigning a device a time-space block code and transmitting over the diversity branches of the time-space-block code using different antennas. The receiving device then collects energy according to the time-space-block code, by simply accumulating energy over the time-frequency resources used for the transmission. Note that receivers or groups of receivers can be distinguished from one another by utilizing different groups of time-frequency resources—a receiver may be configured, whether by radio signaling or by pre-programming, to monitor a particular group of time-frequency resources, whether continuously, or at predetermined intervals.

These techniques enable the use of inexpensive and very-low-power devices to receive data. The techniques may be used to signal a sequence of data bits to a specific receiver, in some cases, e.g., using on-off keying on a dedicated resource over a sequence of time intervals. The techniques may also be used, for example, to signal a receiving device to wake a higher-power "normal" receiver, for subsequent communications via higher-data-rate techniques. In this latter application, the "turn-on" signal can be blindly detected with a low missed-detection rate and a moderate false-alarm rate, enabling the advanced receiver to remain inactivated over a large fraction of the time, thus reducing the device's overall power consumption.

Figure 4:
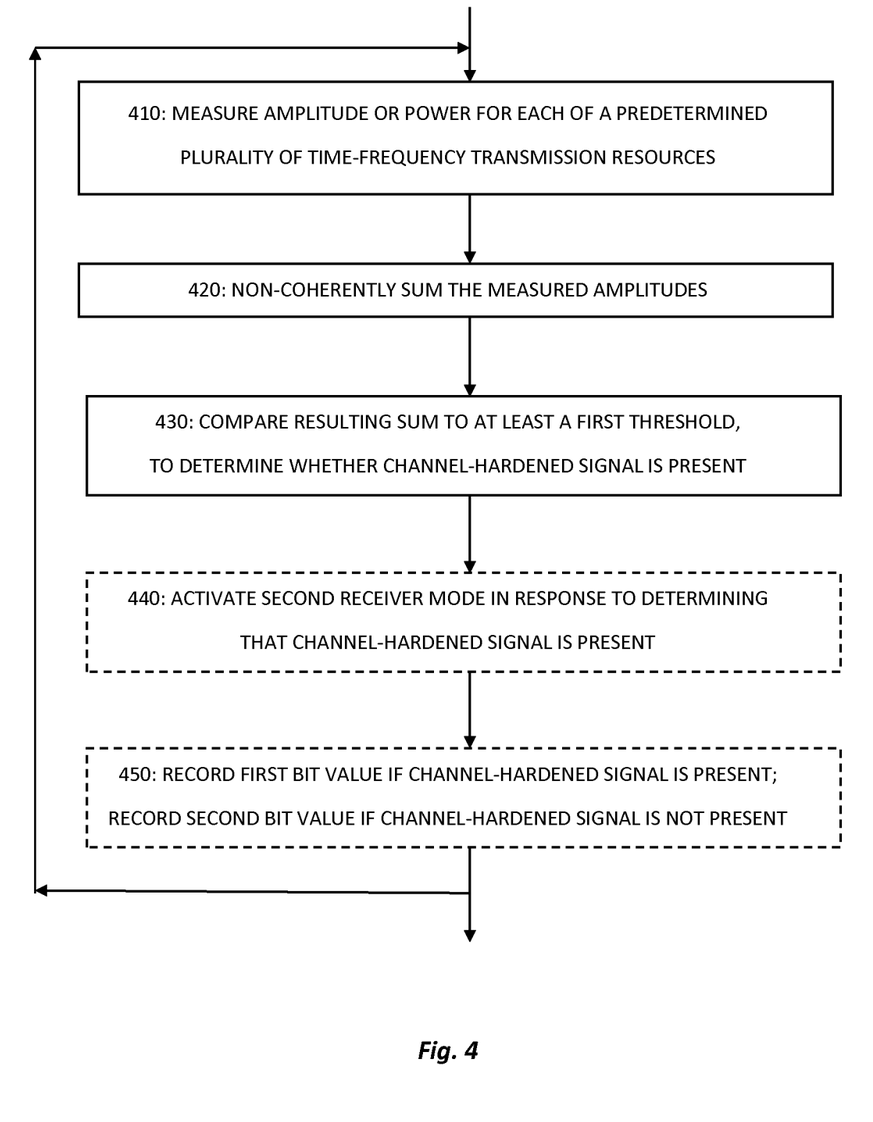
FIG. 4 is a process flow diagram illustrating an example method implemented by a wireless receiver.

FIG. 4 illustrates an example method, carried out by a wireless receiver, for detecting a data transmission formed according to the techniques described above. As shown at block 410, the method includes measuring a signal level for each of a predetermined plurality of distinct time-frequency transmission resources within a first time interval. Note that the measured signal level may reflect the amplitude, power, or energy for the time-frequency transmission resource. Also note that the time-frequency resources may correspond directly to time-frequency resources that are used to carry "normal" data, when the present channel-hardening techniques are not being used, but are not necessarily the same. Thus, for example, the techniques may be implemented in a system that normally uses LTE resource elements for transmitting data—in such a system, the time-frequency transmission resources used for the channel-hardening techniques may be those same LTE resource elements, in some embodiments, or some other time-frequency resource, such as a cluster of adjacent LTE resource elements, in other embodiments.

It should be appreciated that the signal levels could be measured, in some implementations, using a radio-frequency (RF) front-end circuit and with the same digital sampling and fast-Fourier-Transform (FFT) used in conventional LTE receivers, with the measured signal levels thus coming from the FFT output. However, other implementations might use a family of time-domain filters following the RF front-end circuit, for example, with a sufficient number of sampling kernels (e.g., at least as many as the time-frequency diversity order of the channel-hardened signal). In such a scenario, it will be appreciated that each such sampling kernel will be limited in frequency and time, so as to constitute a time-frequency transmission resource as that term is used herein.

As shown at block 420, the measured signal levels are non-coherently summed to obtain a sum. The sum is then compared to at least a first threshold to determine whether a channel-hardened signal targeted to the wireless receiver is present in the first time interval, i.e., to determine whether a channel-hardened signal is present. Note that determining that a channel-hardened signal is present may correspond to determining that a channel-hardened "1" has been signaled, in some embodiments, while determining that a channel-hardened signal is not present corresponds to determining that a "channel-hardened "0" has been signaled. It will be appreciated that this corresponds to simple on-off keying— the techniques may be extended, in some embodiments, to accommodate multiple possible amplitudes for the channel-hardened signal.

As discussed above, a large number of distinct time-frequency resources, e.g., numbering greater than 32, may be used. In some embodiments, resource elements from two or more LTE resource blocks may be used, for example.

In some embodiments, a one-sided test is used, in which case a sum exceeding the first threshold indicates that a channel-hardened signal targeted to the wireless receiver is present in the first time interval. In some of these embodiments, this threshold may be preset, e.g., by programming the device or through the use of configuration messages sent to the device. In others of these embodiments, the illustrated method may be preceded a determining of the first threshold by measuring a signal level for each of the predetermined plurality of distinct time-frequency transmissions within a second time interval, the second time interval being an interval in which no transmitted signal energy is present, according to an indication received by the wireless receiver, non-coherently summing the measured signal levels for the second time interval to obtain a reference sum, and calculating the first threshold based on the reference sum. Note that the measuring and non-coherent summing performed to determine this threshold are similar to the measuring and summing steps illustrated in FIG. 4, but are carried out over a different interval. They may be carried out using a different set of time-frequency resources, for example. Note that the second time interval in these embodiments may be considerably longer than the first time interval, in some embodiments, e.g., more than about ten times as long.

In other embodiments, the detection uses a two-sided test, and thus the method comprises comparing the sum to a second threshold to determine whether a channel-hardened signal targeted to the wireless receiver is present in the first time interval. In these embodiments, a sum exceeding the first threshold but lower than the second threshold indicates that a channel-hardened signal targeted to the wireless receiver is present in the first time interval, i.e., that a channel-hardened signal is present. In some of these embodiments, the the first and second thresholds may be first determined by the wireless receiver, by measuring a signal level for each of a second predetermined plurality of distinct time-frequency transmission resources within a second time interval, the second time interval being an interval in which a reference signal is known to be present, according to an indication received by the wireless receiver, non-coherently summing the measured signal levels for the second time interval to obtain a reference sum, and calculating the first and second thresholds based on the reference sum. Again, the second time interval in these embodiments may be considerably longer than the first time interval, in some embodiments, e.g., more than about ten times as long.

In some embodiments of the illustrated method, the wireless receiver is operating in a first receiver mode when performing said measuring, non-coherently summing, and comparing for the first time interval, and the method further comprises determining that a channel-hardened signal targeted to the wireless receiver is present in the first time interval, based on the comparing shown in block 430, and then activating a second receiver mode, in response to determining that a channel-hardened signal targeted to the wireless receiver is present in the first time interval, where the second receiver mode requiring more energy consumption than the first receiver mode. This is shown at block 440, which is illustrated with a dashed outline to indicate that it need not be present in every embodiment of the illustrated method. While operating in this second receiver mode, the wireless receiver may demodulate and decode data from each of a plurality of time-frequency resources, in some embodiments, e.g., using conventional LTE signal processing techniques or using some other air-interface protocols.

In some embodiments of the illustrated method, the method comprises determining that a channel-hardened signal targeted to the wireless receiver is present in the first time interval, based on the comparing illustrated in block 430, and recording a first one of two bit values for the first time interval, based on this determination, as shown at block 450. In these embodiments, the measuring, summing, comparing, and recording shown in blocks 410, 420, and 430, and 450 may then be repeated, for each of one or more additional time intervals, such that the first one of the two bit values is recorded for each additional time interval in which said comparing indicates that a channel-hardened signal targeted to the wireless receiver is present and a second one of the two bit values is recorded for each additional time interval in which said comparing does not indicate that a channel-hardened signal targeted to the wireless receiver is present. In this way, a message comprising several bits may be received.

Figure 5:
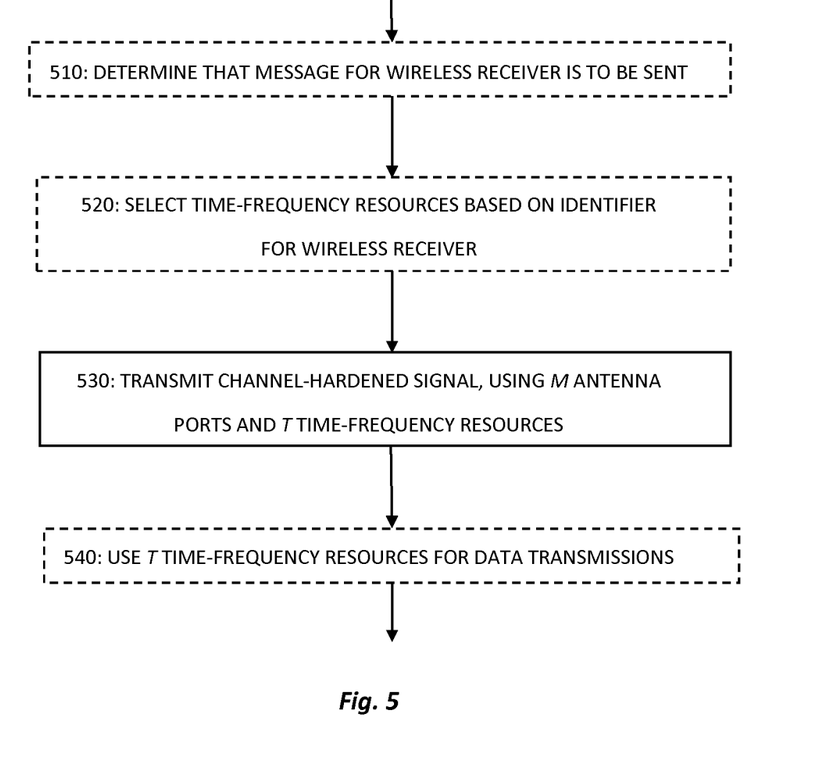
FIG. 5 is a process flow diagram illustrating an example method implemented by a wireless transmitter.

FIG. 5 illustrates an example method, implemented by a wireless transmitter, for encoding a channel-hardened signal according to the presently disclosed techniques. The core of the illustrated method is illustrated at block 530, and comprises transmitting, in a first time interval and using M antenna ports and a first set of T1 time-frequency resources, an array X of M×T1 symbols. Each row of the array corresponds to one of the M antenna ports and each column of the array X corresponds to one of the first set of T1 time-frequency resources, and X satisfies the expression $XX^H = \alpha I$, where $X^H$ is the conjugate transpose of X, I is an identity matrix, and $\alpha$ is a constant. In some embodiments, the rows of the array X consist of orthogonal, length-T1, Zadoff-Chu sequences. In some embodiments, for example, M>32 and T1>M.

In some embodiments, the T1 time-frequency resources may be normally used for transmitting individual data symbols, rather than for sending channel-hardened signals. Thus, the method shown in FIG. 5 may comprise, in some embodiments, transmitting, in a second time interval and using the M antenna ports and first set of T1 time-frequency resources, at least T1 independent data symbols. This is illustrated at block 540.

In some embodiments, the method further comprises, prior to the first time interval, determining that a message targeted to a first wireless receiver needs to be sent. This is shown at block 510. In these embodiments, the transmitting in the first time interval is responsive to said determining. In some of these embodiments, the composition of the array X of M×T1 symbols depends on an identifier for the first wireless receiver. In some embodiments, the method further comprises determining that a message targeted to a first wireless receiver needs to be sent and selecting the first set of T1 time frequency-resources based on an identifier for the first wireless receiver.

In some embodiments, a channel-hardened reference signal or a signal to another receiver may also be transmitted. Thus, the method shown in FIG. 5 may be augmented by the step of transmitting, in a second time interval and using the M antenna ports and a second set of T2 time-frequency resources, an array Y of M×T2 symbols, each row of the array Y corresponding to one of the M antenna ports and each column of the array Y corresponding to one of the first set of T2 time-frequency resources, wherein Y satisfies the expression $YY^H = bI$, where $Y^H$ is the conjugate transpose of Y, I is an identity matrix, and b is a constant, and wherein the second time interval is longer than the first time interval. In some embodiments, b is greater than $\alpha$, e.g., because a higher power level is used and/or because a larger number of time-frequency resources are used for the transmission in the second time interval.

Figure 6:
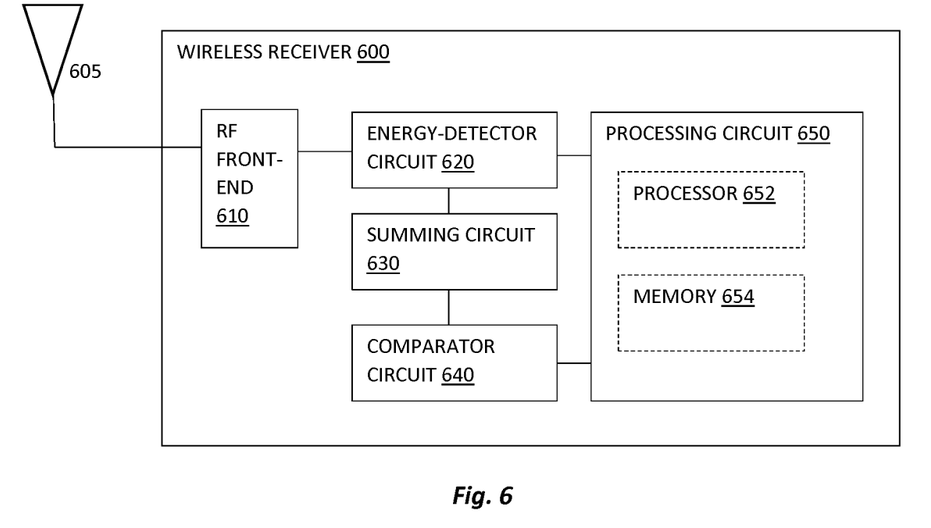
FIG. 6 is a block diagram illustrating components of an example wireless receiver.

FIG. 6 illustrates components of an example wireless receiver apparatus, according to some embodiments of the presently disclosed techniques and devices. The illustrated wireless receiver 600, which in this example is shown with a single antenna 605, includes a radio-frequency (RF) front-end circuit 610 coupled to the antenna 605. The details of this RF front-end circuit 610 will depend on the exact frequency range and channel structure that are used for the presently disclosed techniques, but the RF front-end circuit 610 will generally comprise one or more filters, a low-noise amplifier, a down-converter, and, in many embodiments, an analog-to-digital converter circuit. Note that the subsequent description of wireless receiver 600 assumes that the energy detection, summing, and comparator operations performed on the output of RF front-end circuit 610 are carried out in the digital domain. However, the presently disclosed techniques are not limited to such implementations, and well-known analog circuits corresponding to these energy detection, summing, and comparator operations can be substituted for the digital circuits assumed here.

Wireless receiver 600, further includes an energy-detector circuit 620 configured to measure a signal level for each of a predetermined plurality of distinct time-frequency transmission resources within a first time interval. As discussed above, these time-frequency transmission resources may be LTE resource elements, in some embodiments. The energy-detector circuit 620 may comprise, for example, digital logic or programmed hardware configured to carry out a fast-Fourier transform (FFT) on digital samples provided by RF front-end circuit 610 and extract signal level data (e.g., amplitude or power level data) corresponding to the appropriate resource elements. Alternatively, energy-detector 620 may comprise a plurality of time-domain filters with a sufficient number of sampling kernels to obtain signal level data corresponding to the measured time-frequency resource elements.

Wireless receiver 600 further includes a summing circuit configured to non-coherently sum the measured signal levels to obtain a sum. Again, this may be performed with digital logic or programmed hardware, in various embodiments. Wireless receiver 640 further comprises a comparator circuit 640 configured to compare the sum to at least a first threshold to determine whether a channel-hardened signal targeted to the wireless receiver is present in the first time interval, i.e., to determine whether a channel-hardened signal is present. Again, the comparator circuit 640 may comprise simple digital logic or programmed hardware, in various embodiments.

In some embodiments, the wireless receiver further comprises a processing circuit 650 that is configured to control the other receiver components described above. For example, the processing circuit 650 may set one or more thresholds for comparator circuit, and may control the RF front-end circuit 610 and the energy-detector circuit 620 to tune to specific time-frequency resources. Processing circuit 650 may comprise digital logic, or programmed hardware comprising a processor 652 and corresponding memory 652, or some combination thereof. In some embodiments, for example, the processing circuit may be configured to determine the first threshold by measuring a signal level for each of the predetermined plurality of distinct time-frequency transmissions within a second time interval, using the energy-detector circuit, the second time interval being an interval in which no transmitted signal energy is present, according to an indication received by the wireless receiver, non-coherently summing the measured signal levels to obtain a reference sum, using the summer circuit, and calculating the first threshold based on the reference sum. Likewise, the processing circuit 650 in some embodiments may be configured to determine first and second thresholds for use in two-sided detection by measuring a signal level for each of a second predetermined plurality of distinct time-frequency transmission resources within a second time interval, using the energy-detector circuit, the second time interval being an interval in which a reference signal is known to be present, according to an indication received by the wireless receiver, non-coherently summing the measured signal levels, using the summing circuit, to obtain a reference sum, and calculating the first and second thresholds based on the reference sum.

In some embodiments, processing circuit 650 may be configured to determine that a channel-hardened signal targeted to the wireless receiver is present in the first time interval, based on the comparing circuit's comparing of the sum to at least the first threshold, and to activate a second receiver mode for the wireless receiver 600, in response to determining that a channel-hardened signal targeted to the wireless receiver is present in the first time interval, where the second receiver mode requires more energy consumption than the first receiver mode. In these embodiments, processing circuit 650 may be configured to demodulate and decode data from each of a plurality of time-frequency resources, while the wireless receiver 600 is operating in the second receiver mode.

In some embodiments, processing circuit 650 may be configured to determine that a channel-hardened signal targeted to the wireless receiver is present in the first time interval, based on the comparing circuit's comparing of the sum to at least the first threshold, and to record a first one of two bit values for the first time interval, based on said determining. In these embodiments, the processing circuit 650 may be further configured to, for each of a plurality of additional time intervals, control the components of wireless receiver 600 to: measure a signal level for each of a predetermined plurality of distinct time-frequency transmission resources within the respective additional time interval, using the energy-detector circuit; non-coherently sum the measured signal levels to obtain a sum for the respective additional time interval; compare the sum for the respective additional time interval to at least the first threshold, to determine whether a channel-hardened signal targeted to the wireless receiver is present in the respective additional time interval; and record the first one of the two bit values for each additional time interval in which said comparing indicates that a channel-hardened signal targeted to the wireless receiver is present and record a second one of the two bit values for each additional time interval in which said comparing does not indicate that a channel-hardened signal targeted to the wireless receiver is present.

Figure 7:
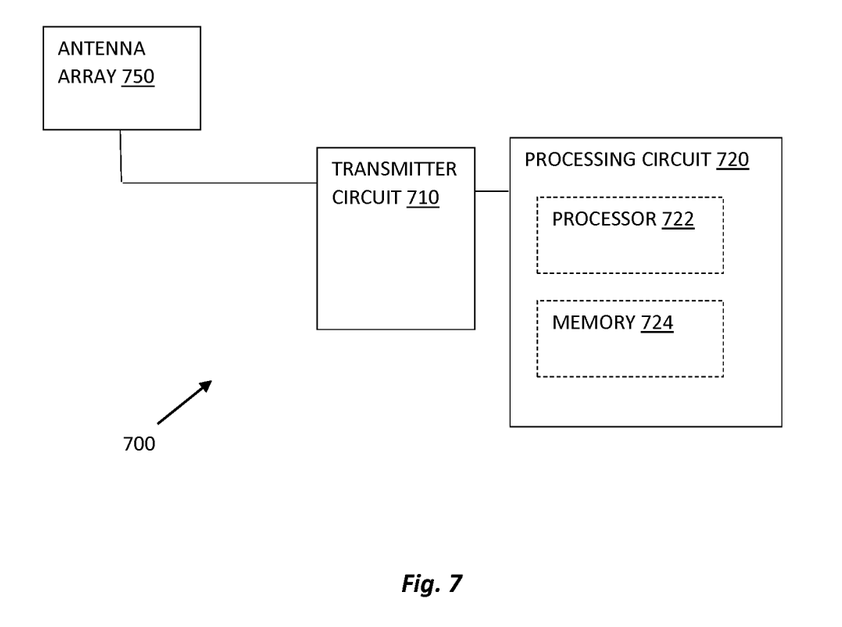
FIG. 7 is a block diagram illustrating components of an example wireless transmitter.

FIG. 7 illustrates an example wireless transmitter 700 configured to carry out some of the presently disclosed techniques. As illustrated in FIG. 7, wireless transmitter includes an array 750 of at least M antenna elements, and a transmitter circuit 710 coupled to the array via M antenna ports. Note that there may be a one-to-one mapping between the M antenna ports and the elements of array 750, but this is not necessarily the case. Transmitter circuit 710, which comprises a combination of suitable radio-frequency components and (typically) digital baseband hardware, is configured to transmit a channel-hardened signal, in a first time interval and using the M antenna ports and a first set of T1 time-frequency resources, where the channel-hardened signal comprises an array X of M×T1 symbols, where each row of the array corresponds to one of the M antenna ports and each column of the array X corresponds to one of the first set of T1 time-frequency resources. As discussed at length above, X satisfies the expression $XX^H = \alpha I$, where $X^H$ is the conjugate transpose of X, I is an identity matrix, and $\alpha$ is a constant. In some embodiments, the rows of the array X consist of orthogonal, length-T1, Zadoff-Chu sequences. In some embodiments, M>32 and T1>M.

The wireless transmitter 700 of FIG. 7 further comprises a processing circuit 720, which may comprise, for example, a programmable processor 722 and corresponding program/data memory 724, and which controls the operation of transmitter circuit. In some embodiments, processing circuit may be configured to, prior to the first time interval, determine that a message targeted to a first wireless receiver needs to be sent, and to control the transmitter to transmit in the first time interval, responsive to said determining. In some embodiments, the composition of the array X of M×T1 symbols may be selected by processing circuit 720 based on an identifier for the first wireless receiver. In some embodiments, the processing circuit may be configured to select the first set of T1 time frequency-resources based on an identifier for the first wireless receiver.

It should be apparent from the discussion and detailed examples provided above that the presently disclosed techniques and apparatus enable, for example, the multiplexing of data signals that are detectable at very low complexity within a legacy data carrier for 5G systems with large antenna arrays. This is enabled by the use of space-time coding over a large antenna system according to a pre-agreed scheme. In a 5G massive-MIMO system, low operating SINR per user is offset by the usage of large antenna arrays.

It will be further appreciated that the detailed examples provided above are exemplary, and that many variations of these detailed examples fall within the scope of the presently disclosed techniques and apparatus.

What is claimed is:

1. A method, in a wireless transmitter, for encoding a channel-hardened signal, the method comprising:
    transmitting, in a first time interval and using M antenna ports and a first set of T1 time-frequency resources, an array X of M×T1 symbols, each row of the array X corresponding to one of the M antenna ports and each column of the array X corresponding to one of the first set of T1 time-frequency resources, wherein X satisfies the expression $XX^H = \alpha I$, where $X^H$ is the conjugate transpose of X, I is an identity matrix, and $\alpha$ is a constant, and wherein M>32 and T1>M.

2. The method of claim 1, wherein the rows of the array X consist of orthogonal, length-T1, Zadoff-Chu sequences.

3. The method of claim 1, further comprising transmitting, in a second time interval and using the M antenna ports and first set of T1 time-frequency resources, at least T1 independent data symbols.

4. The method of claim 1:
wherein the method further comprises, prior to the first time interval, determining that a message targeted to a first wireless receiver needs to be sent;
wherein the transmitting in the first time interval is responsive to the determining; and
wherein the composition of the array X depends on an identifier for the first wireless receiver.

5. The method of claim 1:
wherein the method further comprises, prior to the first time interval, determining that a message targeted to a first wireless receiver needs to be sent and selecting the first set of T1 time-frequency resources based on an identifier for the first wireless receiver; and
wherein the transmitting in the first time interval is responsive to the determining.

6. The method of claim 1, wherein the method further comprises:
transmitting, in a second time interval and using the M antenna ports and a second set of T2 time-frequency resources, an array Y of M×T2 symbols, each row of the array Y corresponding to one of the M antenna ports and each column of the array Y corresponding to one of the second set of T2 time-frequency resources, wherein Y satisfies the expression $YY^H=bI$, where $Y^H$ is the conjugate transpose of Y, I is an identity matrix, and b is a constant, and wherein the second time interval is longer than the first time interval.

7. The method of claim 6, wherein b>a.

8. A wireless transmitter, comprising:
an array of at least M antenna elements; and
a transmitter circuit coupled to the array via M antenna ports and configured to transmit a channel-hardened signal, in a first time interval and using the M antenna ports and a first set of T1 time-frequency resources, the channel-hardened signal comprising an array X of M×T1 symbols, each row of the array corresponding to one of the M antenna ports and each column of the array X corresponding to one of the first set of T1 time-frequency resources, wherein X satisfies the expression $XX^H=aI$, where $X^H$ is the conjugate transpose of X, I is an identity matrix, and a is a constant, and wherein M>32 and T1>M.

9. The wireless transmitter of claim 8:
wherein the wireless transmitter further comprises a processing circuit configured to
prior to the first time interval, determine that a message targeted to a first wireless receiver needs to be sent; and
control the transmitter to transmit in the first time interval, responsive to the determining; and
wherein the composition of the array X depends on an identifier for the first wireless receiver.

* * * * *